(12) United States Patent
Schwarzkopf et al.

(10) Patent No.: US 9,303,805 B2
(45) Date of Patent: Apr. 5, 2016

(54) HEATABLE MEDIUM PIPE

(75) Inventors: Otfried Schwarzkopf, Kürten (DE); Manfred Berg, Wipperfürth (DE); Josef Brandt, Wipperfürth (DE); Tobias Etscheid, Lindlar (DE); Mark Heienbrok, Engelskirchen (DE); Marco Isenburg, Ratingen (DE); Christoph Schöneberg, Wermelskirchen (DE); Markus Jeschonnek, Wipperfürth (DE)

(73) Assignee: VOSS AUTOMOTIVE GMBH, Wipperfurth (DE)

( * ) Notice: Subject to any disclaimer, the term of this patent is extended or adjusted under 35 U.S.C. 154(b) by 418 days.

(21) Appl. No.: 13/811,773

(22) PCT Filed: Jun. 24, 2011

(86) PCT No.: PCT/EP2011/003135
§ 371 (c)(1),
(2), (4) Date: Mar. 22, 2013

(87) PCT Pub. No.: WO2012/010245
PCT Pub. Date: Jan. 26, 2012

(65) Prior Publication Data
US 2013/0186484 A1    Jul. 25, 2013

(30) Foreign Application Priority Data
Jul. 23, 2010 (DE) .......... 10 2010 032 188

(51) Int. Cl.
*F24H 1/10* (2006.01)
*A47J 31/00* (2006.01)
(Continued)

(52) U.S. Cl.
CPC .............. *F16L 53/008* (2013.01); *B23P 11/00* (2013.01); *F16L 25/01* (2013.01); *F01N 2610/10* (2013.01); *F01N 2610/14* (2013.01); *Y10T 29/49826* (2015.01); *Y10T 137/6606* (2015.04)

(58) Field of Classification Search
None
See application file for complete search history.

(56) References Cited

U.S. PATENT DOCUMENTS 4,815,769 A * 3/1989 Hopperdietzel ................. 285/41
4,920,602 A * 5/1990 Kuehbauch ................. 15/250.04
(Continued)

FOREIGN PATENT DOCUMENTS

DE    20 2006 003 590 U1    7/2006
DE    10 2005 037 183 B3    5/2007
(Continued)

*Primary Examiner* — Thor Campbell
(74) *Attorney, Agent, or Firm* — Hudak, Shunk & Farine Co. LPA

(57) ABSTRACT

For a heatable medium pipe having at least one pipe connector and heating element, wherein the heating element has a few wires, in particular one or two wires, wherein the wire(s) extend continuously along the medium pipe and along the at least one pipe connector. In a method for producing a heatable medium pipe, comprising the medium pipe, at least one pipe connector, a transition area between the medium pipe and the pipe connector, and at least one heating element, wherein the heating element has a few wires, in particular one or two wires, the medium pipe is pre-assembled with the at least one pipe connector, the wire or the few wires of the heating element are pre-assembled as a double-laid, one or two-part element or as an element connected to form a continuous part, the wire(s) are fastened on the outside of the pipe connector, transition area and medium pipe, and the ends of the wire(s) are guided into a feed-in connector for connecting to a current source or voltage source.

21 Claims, 8 Drawing Sheets

(51) Int. Cl.
*F16L 53/00* (2006.01)
*F16L 25/01* (2006.01)
*B23P 11/00* (2006.01)

(56) References Cited

U.S. PATENT DOCUMENTS

| | | | | |
|---|---|---|---|---|
| 5,791,377 | A * | 8/1998 | LaRochelle | 138/33 |
| 5,859,953 | A * | 1/1999 | Nickless | 392/489 |
| 5,933,574 | A | 8/1999 | Avansino | |
| 7,311,268 | B2 * | 12/2007 | Sporer et al. | 239/128 |
| 7,875,835 | B2 * | 1/2011 | Tanaka et al. | 219/535 |
| 7,991,273 | B2 * | 8/2011 | Sonderegger et al. | 392/478 |
| 8,075,020 | B2 * | 12/2011 | Colosimo et al. | 285/41 |
| 8,755,681 | B2 * | 6/2014 | Leonard et al. | 392/441 |
| 2009/0242062 | A1 | 10/2009 | Sawada | |
| 2010/0290764 | A1 * | 11/2010 | Borgmeier et al. | 392/468 |
| 2014/0321841 | A1 * | 10/2014 | Etscheid et al. | 392/480 |

FOREIGN PATENT DOCUMENTS

| | | |
|---|---|---|
| DE | 20 2007 010 502 U1 | 1/2009 |
| DE | 20 2008 003 908 U1 | 9/2009 |
| DE | 10 2008 034 238 A1 | 1/2010 |
| EP | 0 312 204 A2 | 4/1989 |
| EP | 1 519 098 A1 | 3/2005 |
| EP | 1 985 908 A1 | 10/2008 |
| EP | 1 721 097 B1 | 10/2009 |
| EP | 2 107 291 A2 | 10/2009 |
| JP | 1-132089 A | 5/1989 |
| JP | 02502683 A | 8/1990 |
| JP | 071397 U | 1/1995 |
| JP | 2007-524053 A | 8/2007 |
| JP | 2009-250271 A | 10/2009 |
| WO | 88 05988 A1 | 8/1988 |
| WO | 2005080850 A1 | 9/2005 |
| WO | 2008 023021 A1 | 2/2008 |
| WO | 2008 131993 A1 | 11/2008 |
| WO | 2009013342 A2 | 1/2009 |
| WO | 2010 057819 A1 | 5/2010 |

* cited by examiner

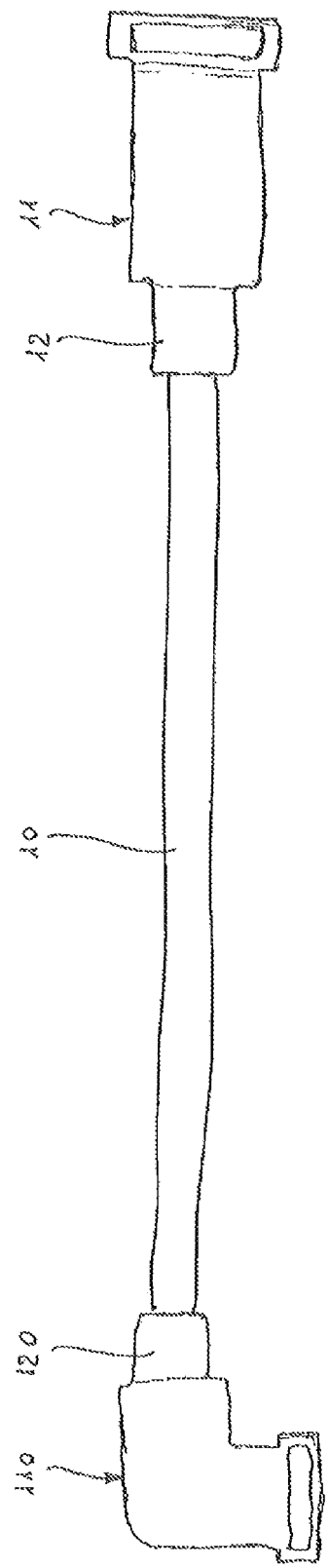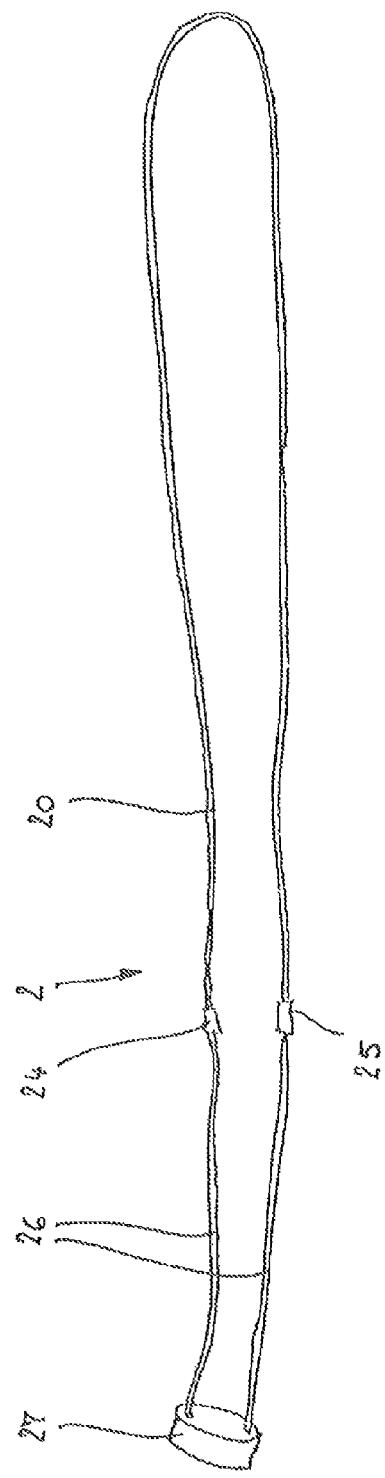

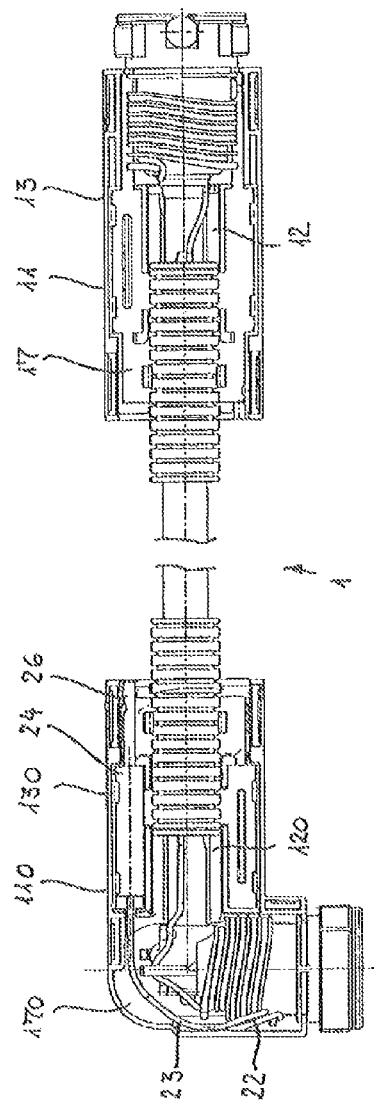
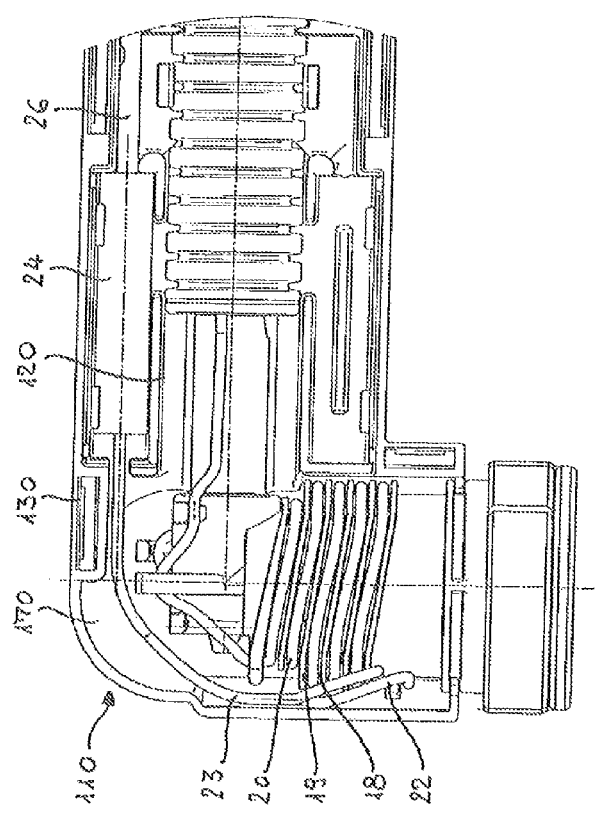
Fig. 8
Fig. 9

HEATABLE MEDIUM PIPE

FIELD OF INVENTION

The invention relates to a heatable medium pipe with at least one pipe connector and a heating element, wherein the heating element comprises a few wires or we strands, in particular one or two wires or wire strands, as well as a method for producing a heatable medium pipe comprising the medium pipe, at least one pipe connector, a transition area between medium pipe and pipe connector and at least one heating element, wherein the heating element comprises a few wires or wire strands, in particular one or two wires or wire strands.

BACKGROUND OF THE INVENTION

Heatable medium pipes and methods for producing same are known in the art. In particular in vehicles a number of medium pipes are provided for conveying mostly liquid media. These medium pipes tend to freeze at low temperatures, which is why they are provided with heating. Pipe connectors are used to connect at least two medium pipes or to connect a medium pipe with a given aggregate. The medium pipes often convey media which due to a relatively high freezing point tend to freeze up at ambient temperatures still at a fairly high level, which means that operability of a vehicle, for example, may be greatly impaired or even interrupted. This is true, in particular, of water pipes for windscreen washer systems, and also for medium pipes where the medium is an aqueous urea solution used as a $NO_x$ reaction additive for Diesel engines with so-called SCR catalysers.

The EP 1 985 908 A1 has disclosed a pipe connector for medium pipes, which consists of a connecting piece with connecting portion for connection with the medium pipe or an aggregate and with a transition portion adjacent to the connecting portion with current channel. At least in the area of the transition portion electrical heating means are provided in an arrangement enclosing at least partially the current channel. The electrical heating means arranged in the transition portion, i.e. outside the connecting portion, are used to prevent the respective medium from freezing within the connecting piece or to reverse the freezing process by thawing the frozen medium. The heating wire wrapped around the outside in the manner of a coil surrounds the connecting piece, wherein at least one further coil winding is arranged inside in the area of the current channel so that when a current flows through the outer heating wire an induction is provided in the inner coil winding for generating heat. The medium pipe consists of an inner pipe line with a heat conductor arranged on the circumference, wherein pipe line and heat conductor are enclosed by an outer envelope such as by a corrugated pipe. Pipe connectors are attached at both ends of the medium pipe. Prior to fitting the corrugated pipe an adhesive tape is wrapped around the heat conductor arranged on the pipe line and thereby fixed to the pipe line. Alternatively the fixing may be effected by using a varnish or adhesive layer. The heating wires of the pipe connectors and the heat output of the pipe line are electrically interconnected, wherein the heating wire of one of the pipe connectors, respectively, is electrically switched in series with one of the winding wires of the heating wire surrounding the pipe line, and the connecting ends of the two series connections at the two pipe connectors are run to outside, where a connection to a voltage source or a further connection is provided. Alternatively it is disclosed that the heating wires of the pipe connectors and the windings surrounding the pipe line are provided in the form of a series connection of all heating wires with only one outside line connection. In each case a pipe line with heating wires wrapped around it is subsequently cut to length, before being connected with the two pipe connectors and the heating wires fitted to its outside. This is disclosed for example in the DE 10 2005 037 183 B3 or EP 1 519 098 B1.

As detailed in the DE 10 2005 037 183 B3 the pipe line is initially implemented as an endless pipe and subsequently cut to a defined length. This pipe already comprises the heating wire as an electrically conductive plastic layer. As an alternative this publication of the prior art discloses that the electrical feed lines are melted into the pipe. Further it is disclosed that the pipe line may comprise grooves extending as far as the heating element and clamped or glued into the electrical feed lines. Or the electrical feed lines and, as required, further components of the pipe may be extruded, which means that the electrical feed lines and the heating element are produced together within one production process.

Correspondingly, with the electrically heatable medium pipe or liquid pipe disclosed in the EP 1 519 098 B1, the heating wire is wrapped helically around an inner plastic layer with an electrically insulating tape being wrapped directly around the plastic layer and the heating wire. The heating wire is wrapped around the plastic layer in the form of a double helix, and the ends of the heating wire are connected with a plug which can be plugged into a socket or a voltage source.

Further the EP 1 721 097 B1 discloses an electrically heatable medium pipe, where the medium pipe, a cable for heating the medium pipe and at least one electrical connector for connecting the cable to the current source are provided. The medium pipe and the cable are completely received in an outer protective envelope comprising a first tube with an inner cross-section which exceeds the outer cross-section of the medium pipe. At one end or both ends of the cabling the cable is run separate from the medium pipe and within a branch piece. It is run to a second tube on the electrical connector. The outer protective envelope encompasses the first tube, the branch piece and the second tube, wherein the branch piece is arranged between the first and second tube. This means that at least on one side the cable is not run to a pipe connector but directly into the branch line and in there, to a plug connector for connection to an electrical energy source. According to this publication of the state of the art therefore, it is not the pipe connector which is heated but merely the medium pipe.

The EP 2 107 291 A2 has disclosed a fluid line, where pipe connectors are attached to the ends of an elastic pipe line. A heat conductor is fitted into the pipe line and the ends thereof are pressed in between pipe connector sections arranged in the pipe connectors. The heat conductor is connected with a connecting wire by a connecting section and thereby with an energy source. The heat conductor is laid as a loop within the pipe line and ends in the area of the loop in front of the second pipe connector. Although due to the heat conductor lying inside the pipe line the heat can be introduced directly into the medium flowing inside the medium pipe or pipe line, the wires or wire strands of the heat conductor must be highly resistant against the medium flowing in the medium pipe resulting in proportionally high cost as regards the heat conductor. Further it has proven to be laborious to insert the conductor loop, i.e. the doubled-up conductor into the pipe line in a desired helical or meandering configuration. Also the costs for a pipe line of this kind are higher than for pipe lines, for which the heat conductor is run on the outside, because the inner diameter, and possibly also the wall thickness of such a pipe line, through which the heat conductor is run, must be comparatively larger in order to accommodate these without creating an obstruction in the medium flow.

It has proven to be expensive, when providing pipe connectors with heating wires wrapped around them and a pipe line separately provided with heating wire, to connect the respective heating wires of pipe connectors and pipe line, since this is time-consuming and must be carried with great care in order to ensure a proper electrical connection resulting in production being a drawn-out process. With a continuous enwrapping process a heating wire could be wrapped around a pipe line and the pipe line could be pre-assembled with adhesive tape or textile adhesive tape and stored on coils. To produce the respectively required heatable medium pipe the pipe with wrapped-around heating wire must then be cut to the desired length, the adhesive tape or textile adhesive tape must be removed from both ends of the cut-to-length pipe, the respective heating wire ends must again be unwrapped, the excess pipe length must be cut off, the pipe length must be adjusted and the cuts must be cleaned. At one pipe connector which could also be pre-assembled with a wrapped-around heating wire, the heating wires would have to be unwrapped again from the ends and connected with the heating wire ends of the medium pipe, in particular via crimping points. On the one hand a number of process steps would thus be required in order to produce the heatable medium pipe containing the enwrapped pipe and the pipe connectors, or to initially connect pipe and pipe connecters or the heating wires arranged thereon with each other. On the other hand, due to producing a pre-assembly comprised of the pipe provided with heating wire and textile adhesive tape or adhesive tape which would later be cut to length to suit the respective application, a large number of offcuts would occur and thus high material cost due to the unwinding or unwrapping of heating wire at the ends of the pipe and the pipe connectors, cleaning and trimming the pipe for creating free wire or wire strand lengths of heating wire for contacting the same and due to providing crimping points, also high personnel cost during manufacture. Apart from the material loss due to offcuts, costs would occur because of relatively high production expenditure with a lot of work by hand being required. Later, when the heatable medium pipe is installed for example in a vehicle, in particular a lorry, these crimping points are exposed to vibrations leading to damage occurring which could result in short-circuits.

SUMMARY OF THE INVENTION

The present invention is based on the requirement to provide a heatable medium pipe the manufacture of which permits expenditure to be reduced to a minimum for simultaneously a very good heat input into the medium flowing within the medium pipe both in the area of the pipe connectors and in the area of the medium pipe extending in between these.

This object is solved by a heatable medium pipe having at least one pipe connector and a heating element, wherein the heating element has a few wires or wire strands, wherein one and the same wire or wire strand or wires or wire strands extend continuously both along the medium pipe and along the at least one pipe connector. The object is further solved by a method for producing a heatable medium pipe comprising the medium pipe, at least one pipe connector, a transition area between medium pipe and pipe connector and at least one heating element, wherein the heating element comprises a few wires or wire strands, wherein the medium pipe is pre-assembled with the at least one pipe-connector, the few wires or wire strands of the heating element are pre-assembled as a double-laid or one- or two-part element or as an element connected to form a continuous part, the wire or wire strand or wires or wire strands are arranged, fixed on the outside of the pipe connector, the transition area and the medium pipe and the ends of the wire or wire strand or wires or wire strands are run into a feed-in connector for connecting to a current or voltage source. Further developments of the invention are defined in the dependent claims.

In this way a heatable medium pipe is produced, far which it is no longer necessary to cut the medium pipe with heating elements fitted to the required length and to then laboriously connect the ends of the heating elements or wires or wire strands surrounding the medium pipe and heating elements surrounding the pipe connectors, in particular to crimp and seal the same, in particular to provide them with shrink tubing. Rather the same wire or wire strand or wires or wire strands which extend along the medium pipe can be used also for heating the one or more pipe connectors as they also extend along the same. Thus a common heating element is used for heating the medium pipe and the one or more pipe connectors. The wires or wire strands of the heating element therefore extend without interruption along the medium pipe and along the at least one pipe connector. The provision of additional wires or wire strands for heating the pipe connectors is waived compared to the state of the art, so that the wires or wire strands otherwise provided on the pre-assembled pipe connectors and thus also the joints required between these wires or wire strands and those along the medium pipe can be omitted. Therefore no joints are provided between medium pipe and pipe connector, but a joint may be provided between two wires or wire strands or to cold conductors or electrical connectors for connecting the wires or wire strands of the heating element to a current or voltage source.

Advantageously the one or two wires or wire strands extend without any joints in the transition area between medium pipe and pipe connector and also continuously along the pipe connector itself and the medium pipe on the respective outside thereof. In this way it is possible to keep the entire transition area between medium pipe and pipe connector free from joints. In particular in the transition area from the substantially less rigid medium pipe to the very rigid pipe connectors joints might be very susceptible to damage caused by vibrations. It is therefore advantageous not to provide any connections to cold conductors or in particular between the two wires or wire strands extending continuously along the medium pipe and pipe connectors.

Due to providing one or two, i.e. a few wires or wire strands of the heating element which extend continuously along the medium pipe and the pipe connector(s) there is no longer any need for joints here, and because only one or two wires or wire strands are provided, material cost are also reduced. Thus the amount of different heating wires or wire strands to be stored for a medium pipe is reduced, leading to economies of scale, i.e. efficiency gains which are reflected in a lowering of the unit costs, because larger purchasing quantities are required for a smaller variety of wires or wire strands.

Since the wire or wire strand or wires or wire strands extend on the outside of the medium pipe and the pipe connectors it is not necessary to pay particular attention to the wire or wire strand resistance in relation to the medium flowing through the medium pipe. This means that more cost-effective wires or wire strands can be chosen than for example according to the solution of the EP 2 107 291 A2. Thus it is advantageously possible to save costs compared to existing solutions and at the same time, due to wrapping or providing the wire or wire strand or wires or wire strands continuously along the pipe connectors and the medium pipe, to minimise or avoid altogether the risk of unsatisfactory connections or an involuntary breaking of joints, for example through vibrations or other negative influences during operation of the vehicle.

Crimping points are, in principle, predetermined breaking points, since in particular they tend to break when being constantly impacted by transverse forces. This not only causes a quality problem, but also if the insulation is damaged, brings with it the danger of a short-cut. This can be advantageously avoided by providing wires or wire strands without joints.

Integration of the wire or wire strand or wires or wire strands of the heating element and the pipe connectors or the medium pipe may be accomplished in a simple manner, as follows: the medium pipe is initially pre-assembled with at least one pipe connector, and thereafter the wire or wire strand or wires or wire strands of the heating element are arranged along the medium pipe and the at least one pipe connector on the outside thereof and fixed in position thereon. When providing only one heating element wire or wire strand this may be laid double, i.e. a loop may be formed which in particular is fixed on the pipe connector. The ends of the wire or wire strand or wires or wire strands are then guided into a feed-in connector for connecting to a current or voltage source. Where two wires or wire strands are provided, these may be guided in parallel to the at least one pipe connector, the transition area to the medium pipe and along the same.

Advantageously the wire or wire strand or wires or wire strands are one-piece parts or are connected to form a continuous part or are connected with each other via a device. In particular two identical wires or wire strands may be provided when using two connected parts. If the wires or wire strands are connected to form a continuous part before being connected to the medium pipe, the expenditure for the integration of the wires or wire strands of the heating element and the medium pipe can be kept to a minimum. It is thus possible to provide a continuous one-part wire or wire strand or two wires or wire strands connected to form a continuous part, wherein if two identical wires or wire strands are chosen, their heating output will be commensurate in order not to have to take any further measures for adapting the same. It is also possible to run two wires or wire strands in parallel with each other, which are connected by only one device which for example may be a strap element in order to permit fixing the wires or wire strands on the outside of a pipe connector. In principle, it is also possible to provide no connection between the two wires or wire strands.

At the ends of the wire or wire strand or wires or wire strands at least one branching-off point or connecting point may be provided for connecting a connector for connection to an energy supply. Due to providing a one-part wire or wire strand or wires or wire strands connected to form one part, such a cold conductor or electrical connector connection, i.e. such a branching-off or connecting point for connecting a cold conductor or electrical connector for connection to an energy supply (current or voltage source), may thus be provided on the ends of the wire or wire strand or wires or wire strands, so that instead of a large number of connections or crimping points merely two such points, i.e. at both end of the at least one wire or wire strand, may be provided. When providing an originally divided heating element with two identical wires or wire strands, these may be connected at one end with each other, as mentioned, and this connecting point (joint) of the continuous heating element can then be fixed within the at least one pipe connector, so that at the other ends of the wires or wire strands a cold conductor or electrical connector can again be connected to an energy supply.

Advantageously the wire or wire strand or wires or wire strands extend close to the pipe by the shortest route relative to the pipe around the same, advantageously at a pitch of approximately 20 to 150 mm, in particular at a pitch of 40 to 60 or to 80 mm. They may be guided in the form of a meander and/or of strung-out waves and/or preferably in the form of a spiral. Along the medium pipe it is sufficient in principle to have the wire or wire strand or wires or wire strands running in parallel to the same and by this means to achieve a sufficient heat input, wherein at the same time an efficient material input relative to the wire or wire strand length is possible. However, during bending to shape and connecting wire or wire strand and medium pipe it is more advantageous to wind the wire or wire strand at a pitch about the medium pipe. A large pitch, as a rule, is energetically sufficient, i.e. it permits a sufficient heat input. According to technical aspects it may be up to 150 mm. An infinite pitch, i.e. running the wire or wire strand in parallel to the pipe, would be energetically sufficient, but technically problematic. For pitches of more than 150 mm there arises the problem, when the medium pipe is being bent, that the wire or wire strand does not follow the bend of the medium pipe, but lifts off the same. The most favourable pitch being a compromise for technical and economic aspects is, for example, a pitch in the range of 40 to 80 mm, in particular with regard to the heating element wire or wire strand length, which may be provided, and the technical practicability during enwrapping the tubular medium pipe.

The partial sections of the wire or wire strand or wires or wire strands along the medium pipe may be wrapped around the medium pipe approximately in parallel to each other on two opposing sides of the medium pipe and/or at a very large pitch, in particular a pitch of 20 to 150 mm, for example a pitch of 40 to 80 mm, along the medium pipe and/or strung-out in a meandering fashion and/or spirally. A good heat input into the medium pipe is possible already with two wires or wire strands or wire or wire strand parts extending in parallel.

During generating a uniform heat input in the area of the pipe connector and the medium pipe and the transition area between medium pipe and pipe connector, an adapted varying pitch can be provided for wrapping. A correspondingly large pitch of up to 150 mm may be provided along the medium pipe, whereas in the transition to the pipe connector and along the same a lesser pitch appears to make more sense, so that the heat input across the entire length of the heatable medium pipe can be kept approximately constant or can be raised at points, at which an especially high heat input is required. Particularly in the area of the pipe connectors the material thickness will be greater than along the longitudinal extension of the tubular medium pipe, so that providing a lesser pitch for enwrapping the pipe connectors and, as required, also the transition area to the medium pipe, has proven to be advantageous. The influence of the pitch of the wires or wire strands in the area of the medium pipe is high in relation to the material input because the medium pipe may, for example, have a length of 4.5 m, whereas the influence in the area of the pipe connectors is small, because here only short dimensions are enwrapped. In relation to the heat input this is 15 Watt per meter for the medium pipe and 1.5 Watt per pipe connector. In contrast to the large pitch along the medium pipe of up 120 mm a pitch of, for example, 3 mm may be provided along the pipe connector.

When providing a small pitch in the area of the pipe connector a spiral-shaped and/or meander-shaped winding or a strung-out winding may be provided about the pipe connectors. Also mixed forms of meandering, spiral-shaped or strung-out windings or varying windings on pipe connector, transition area and medium pipe are possible.

The wire or wire strand thickness of the heating element or its diameter or the thickness of the core of the heating element, in particular the insulated metallic core, may be less than 0.2 mm, in particular 0.12 mm, 0.14 mm, 0.18 mm, with a tolerance of ±0.4 mm, as required. Intermediate values are, of course, possible, for example a wire or wire strand thickness of 0.10 mm, 0.11 mm, or less than 0.12 mm.

The medium pipe may, for example, have an inner diameter of 2 to 4 mm, in particular an inner diameter of 2 to 3 mm providing an inner diameter in this range has proven to be a particularly economic variant. The wall thickness of the tubular medium pipe may be, for example, between 0.5 and 1 mm, in particular 0.7 mm. The air gap between the outside of the tubular medium pipe and the inside of the corrugated pipe surrounding the medium pipe and the wire or wire strand or wires or wire strands wrapped around the same may be approx. 0.1 to 0.4 mm, in particular 0.1 to 0.2 or 0.2 to 0.4 mm. Such an air gap is sufficient to ensure good heat insulation. Fixing of the wires or wire strands of the heating element to the outside of the tubular medium pipe may be effected by an adhesive tape or a textile tape. In principle other fixing methods are also suitable, but wrapping with an adhesive tape, a textile adhesive tape or a textile tape has proven to be cost-effective and very good as regards reliability of the fixing.

The corrugated pipe as an outer protective device for the medium pipe may be provided as a closed corrugated pipe which during pre-assembly of the medium pipe with initially one pipe connector may pushed onto the pipe, starting from the open end of the medium pipe along the same and along the transition area of the pipe connector and fixed at that location. When pre-assembling the medium pipe with two pipe connectors a longitudinally-slit variant of a corrugated pipe is advantageously provided, which after connecting the module of the pre-assembled medium pipe including end-side pipe connectors, with the module of the wire or wire strand or wires or wire strands of the heating element and its fixing on the outside of the medium pipe, transition area and pipe connectors, is arranged surrounding the medium and the two transition areas from the outside. A more cost-effective variant has, however, proven to be the provision of a radially closed corrugated pipe.

For the final assembly of the heatable medium pipe it has proven to be advantageous to fix the wire or wire strand or wires or wire strands on the one pipe connector and to guide or connect their two partial sections or the wires or wire strands continuously along the pipe connector, the transition area and the medium pipe on the outside thereof. It is also possible to fix the wire or wire strand or wires or wire strands to both pipe connectors and to arrange these after enwrapping the pipe connectors and the transition area to the medium pipe such that they wind around the same. Here tolerance compensation may be deliberately provided in that the number of windings are varied or the pitch is varied, in particular when enwrapping the medium pipe from one end to the other. Also tolerance compensation may result automatically by varying the pitch. Arranging the wire or wire strand or wires or wire strands is, for example, effected by arranging the two pipe connectors in corresponding holders and providing an initial tension which acts upon the wires or wire strands or wire or wire strand parts along the medium pipe approximately centrally along their longitudinal extension, exerting a tensile stress upon the same, in particular during rotational movement for winding the wire or wire strand or wires or wire strands around the medium pipe. In this way the wires or wire strands or wire or wire strand parts can thus be wound around the medium pipe, wherein due to exerting initial tension a desired positioning and pitch of the individual windings along the medium pipe is possible and tolerance compensation is effected automatically.

Advantageously at least one device for the protection and/or insulation of the pipe and/or the pipe connector and/or the transition area between medium pipe and pipe connector may be arranged about the same, in particular a corrugated pipe for enveloping the medium pipe and protective caps for enveloping the one or more pipe connectors and the transition area to the medium pipe, surrounding the same. Such protective caps then surround not only the pipe connectors and the transition area to the medium pipe, but also a part of the corrugated pipe enveloping the same, so that a compact unit is provided between the tubular medium pipe and the pipe connectors for forming a completely heatable medium pipe, wherein also a branching-off point of the heating element for connecting the same to an energy source may be protected by enveloping it against damage with such protective caps.

In particular when providing a two-wire or wire strand heating element with plugs at the ends, which are connected via cold conductors or electrical connectors with the wires or wire strands of the heating element, i.e. for when two wires or wire strands of the heating element are connected in parallel, at least one strap element may be inserted between the two wires or wire strands for mechanically connecting the same. Such a strap element may be hooked into a corresponding receiving device on a pipe connector and this can be used to fix the heating element to the pipe connector.

It is also possible to provide a double-laid continuous wire or wire strand of the heating element, at the ends of which a connector is directly arranged for connecting to an energy source, thereby completely precluding the provision of connecting or crimping points between the wire or wire strand of the heating element and the cold conductors or electrical connectors for connecting to an energy source. Such a heating element or such a continuous double-laid wire or wire strand may, in the area of its loop, again be fixed or attached to a receiving device provided at this point and may be subsequently wound about the pipe connector, the transition area to the medium pipe and the medium pipe.

Advantageously the heating element may be fitted adaptively to the medium pipe and/or the pipe connector, in particular the wire or wire strand or wires or wire strands, a fastening element for fastening the wire or wire strand or wires or wire strands on the medium pipe and/or an insulation and/or protection device for insulation or protection of the medium pipe and/or the pipe connector and/or the transition area between medium pipe and pipe connector may be fitted. An adaptive fitting means that a wire or wire strand or wires or wire strands are provided which are adapted to the requirements of the respective application. In this way pipes can be offered in different variants. This would preclude the use of a predefined arrangement and heating element amount as used for the preassembled medium pipe according to the state of the art. Rather, due to enwrapping the module for conducting the medium after it, has been assembled, the wires or wire strands may be arranged exactly at those points, at which a heat input into the medium pipe and the pipe connectors is desired or is necessary. In comparison to a wire or wire strand integrated with the wall of the pipe line, a medium pipe can be provided with adaptively varying windings, in particular at a desired pitch. When embedding a wire or wire strand into a pipe line wall as described in the state of the art, this is part of the extrusion process for manufacturing a pipe line, and to introduce variations is therefore much more complicated. Further an adaptive fitting offers the possibility of manufacturing/providing a pipe line with a lesser wall thickness, thus reducing the material requirement compared to embedding the wires or wire strands into the pipe wall of the medium pipe, which leads to a comparatively increased material requirement.

According to the invention therefore, an enwrapping process is provided, where the module including the media pipe and at least one pipe connector mounted at the ends, and the module comprising the heating element are pre-assembled separately from each other, and only thereafter both modules are integrated to form one product, i.e. the heatable media pipe. A further module subsequently represents the device for insulation or protection, i.e. in particular an enveloping by a corrugated pipe and protective caps. By providing such modules a modular system, i.e. a heatable medium pipe of modular construction is created, which makes it possible to cost-effectively produce the most varied embodiments of heatable medium pipes which in addition can be assembled in a short time.

BRIEF DESCRIPTION OF THE DRAWINGS

For further explanation of the invention embodiments thereof will now be described in detail with reference to the drawings, in which FIG. 2 shows a side of a pre-assembled medium pie with two pipe connectors, FIG. 3 shows a first embodiment of a heating element according to the invention in the form of a one-part double-laid wire or wire strand with cold conductor or electrical connector connection and plug connector for connecting to an energy source, FIG. 8 shows a top view of a further embodiment of a heatable medium pipe fully assembled according to the invention with open protective cap, FIG. 9 show a detail view of an angled pipe connector according to FIG. 8.

DETAILED DESCRIPTION OF THE INVENTION

Figure 1:
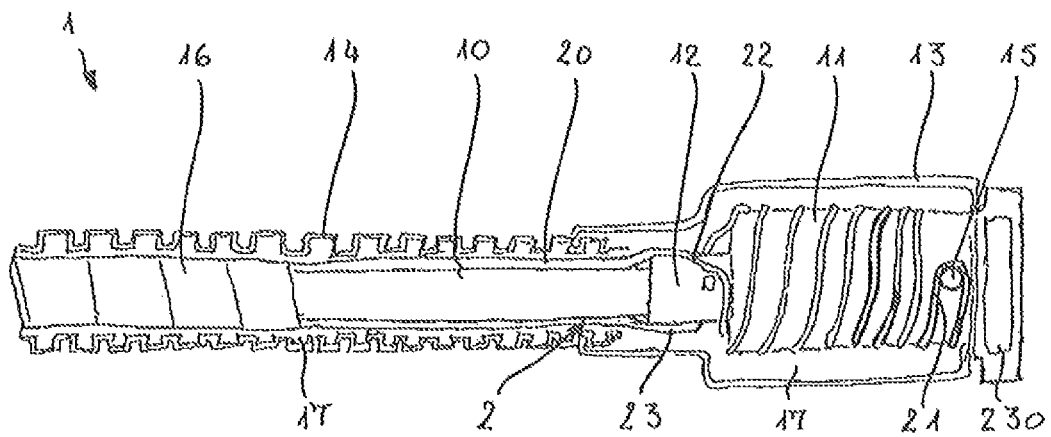
FIG. 1 shows a first embodiment of a heatable medium pipe according to the invention.

FIG. 1 shows a section of a heatable medium pipe 1 comprising a tubular medium pipe 10, a pipe connector 11 with a transition area 12, in which pipe connector and medium pipe 10 are connected with each other, a protective cap 13, which as a rule is constructed of two parts, i.e. two half-shells, which protectively encloses the pipe connector 11 and the transition area 12 and a section of the tubular medium pipe 10, and a corrugated pipe 14 surrounding the tubular medium pipe 10. At the end of the protective cap 13, a holding element 230 is attached for connecting the pipe connector to a further line, an aggregate etc. via, in particular, a plug. A wire or wire strand 20 of a heating element 2 is guided along the pipe connector 11 and the tubular medium pipe 10. The wire or wire strand is laid double such that a loop 21 is fixed to a centering pivot 15, for example, on the outside of the pipe connector 11. The wire or wire strand is therefore comprised of two partial sections 22, 23 which are wound in parallel to each other and in the transition area 12 are guided separately from each other on two opposing sides of the medium pipe 10. This type of parallel arrangement is, however, not preferable, since when the medium pipe is bent, the wire or wire strand does not remain in its position, but tends to lift off the medium pipe surface.

In order to fix the two partial wire or wire strand sections 22, 23 in their position, an adhesive tape or a textile adhesive tape or a textile tape 16 is wound around the outside of the medium pipe 10 with fitted wire or wire strand 20. Only a part of this is shown in FIG. 1. In principle it is possible to provide such a fixing only in a narrow area, i.e. not across the entire longitudinal extension of the medium pipe, but only at spaced-apart points. Further it is possible to wind the adhesive tape or a textile adhesive tape or a textile tape 16 or another fixing device across the entire longitudinal extension of the medium pipe 10. The adhesive tape or a textile adhesive tape or a textile tape 16 may either follow the wire or wire strand or may be arranged over the entire area, overlapping as required, over the wire or wire strand and the medium pipe, as explained in detail with reference to FIG. 15.

As already mentioned the corrugated pipe 14 is arranged for the external protection and insulation of the medium pipe 10 with fitted wire or wire strand 20 of the heating element. Due to providing a corrugated pipe it is possible to form an air gap or to provide air-enclosing chambers which permit an insulation of the medium pipe. Such an air gap is also arranged between the pipe connector or the transition are to the medium pipe and the protective cap 13 enclosing it, as revealed in FIG. 1.

Figure 10:
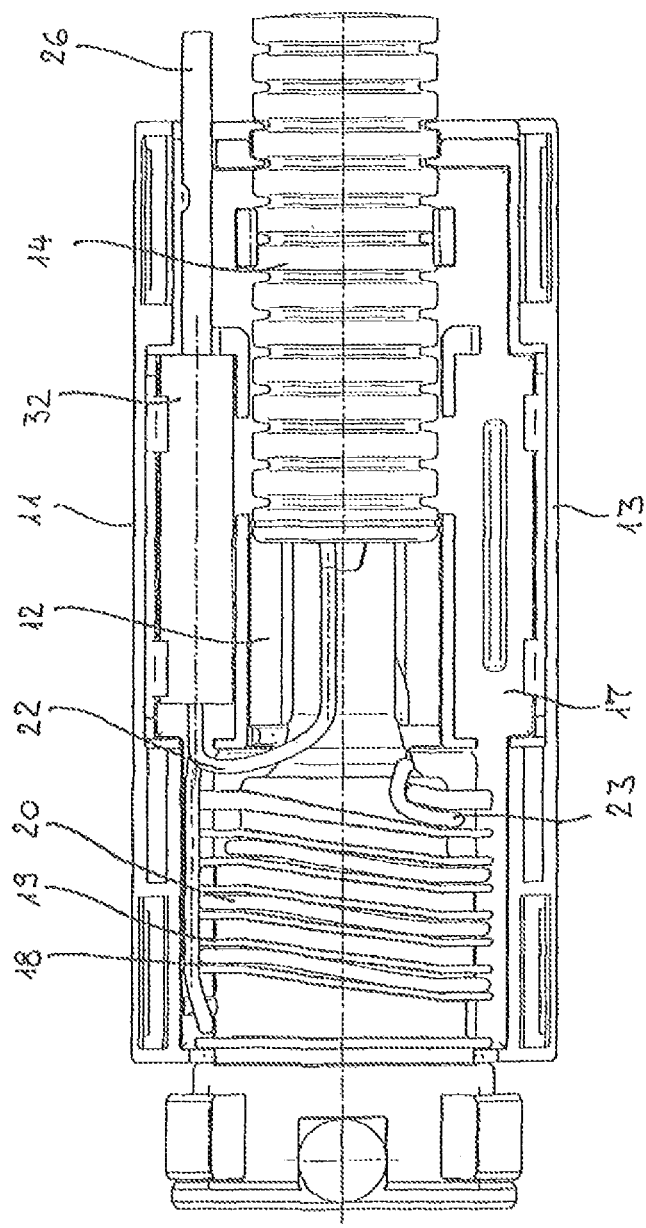
FIG. 10 shows a top view of a variant of a straight pipe connector with heating element and opened protective cap.

As revealed particularly well in FIGS. 8 to 10, the wire or wire strand 20 with its two partial section 22, 23, can be guided in winding grooves 18 on the outside of the one or more pipe connectors 11, 110. The winding grooves are limited by or formed by protruding ribs 19 on the outside of the pipe connector. This permits an unequivocal positioning of the wires or wire strands on the outside of the pipe connector, thereby allowing fixing with an adhesive tape or textile tape as provided along the medium pipe to be omitted. If such winding grooves are not provided, fixing of the wire or wire strand or wires or wire strands of the heating element 2 may, of course, also be provided in the area of the pipe connector 11, 110 with the aid of an adhesive tape or textile tape or other fixing device.

FIGS. 2 and 3 show the pre-assembled modules which subsequently are combined and assembled to form the completed heatable medium pipe according to FIG. 1. The module shown in FIG. 2 is the module guiding a fluid or a medium, which comprises the tubular medium pipe 10 and two pipe connectors 11, 110 with respective transition areas 12, 120. The module shown in FIG. 3 is the heating element 2 consisting according to FIG. 3 of a double-laid wire or wire strand 20 with connections 24, 25 provided at the ends and connected cold conductors or electrical connectors 26 with attached plug connector 27. The first module consisting of two pipe connectors and a medium pipe is thus pre-assembled, as is the second module provided for heating and consisting of the heating element with connected cold conductors or electrical connectors and plug connectors for connecting to an energy source. These two modules are then "married" to each other, i.e. the module of the heating element is guided or wound around the outside of pipe connectors, transition areas and medium pipe. The effect of this is that the normally necessary amount of labour is no longer necessary, i.e. no more cutting-to-length of the medium pipe already equipped with heating element wires or wire strands wrapped around it, thus leading to a reduction in assembly work and also to a reduction in cost, since the assembly according to invention of two pre-assembled modules brings less waste with it.

Following the combination of the first and second modules, the heating element, at least partially, is then fixed on the outside of the first module, a corrugated pipe opened along its longitudinal axis and called a slit corrugated pipe in the following, is radially fitted to the outside of the medium pipe 10 and transition areas 12, 120, and the pipe connectors 11, 110 and part of the corrugated pipe 14 are enclosed by the protective caps 13, 130. The protective caps are normally foamed for further insulation in the inner air gap 17, 170 (see FIGS. 8 to 10).

Instead of providing a medium pipe 10 pre-assembled with two pipe connectors 11, 110, this may be pre-assembled with merely one pipe connector as a first module. Such a first module is combined and connected, as described above, with a second module of the heating element with possibly added-on cold conductors or electrical connectors and plug connectors. Assembling the corrugated pipe is then easier than with the above-described procedure because this can then be pushed axially onto it starting from the free end of the medium pipe 10. Subsequently the second pipe connector is assembled to the free end of the medium pipe 10 and the protective caps are added onto both pipe connectors including possibly foaming the inner cavities of the protective caps.

The fully assembled heatable medium pipe 1 can now be bent to shape, in order to be adapted to the installation site. To this end medium pipe 10 and corrugated pipe 14 consist of a bendable material.

Figure 4:
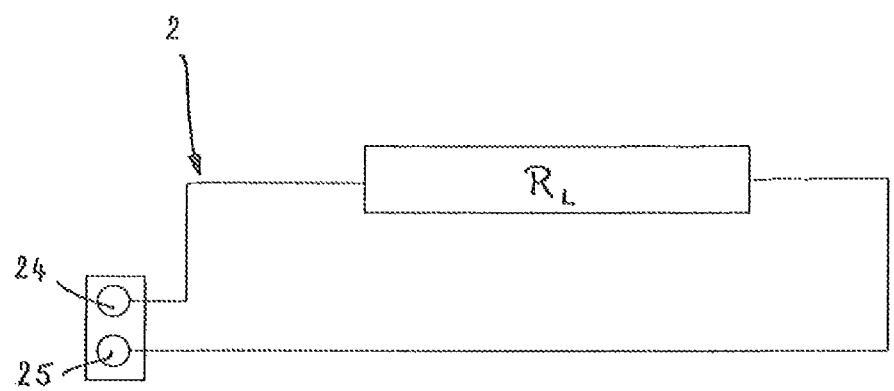
FIG. 4 shows an electrical circuit diagram of the heating element according to FIG. 3.

FIG. 4 shows an electrical circuit diagram of the heating element according to FIG. 3, wherein it can be seen that only two connecting points 24, 25 or crimping points are required for connecting the heating element and the cold conductors or electrical connectors 26, contrary to the normally five connecting points. Furthermore the heating element represents only one single resistance $R_L$, thereby making it easier and more cost-effective, as opposed to the usual arrangement of at least four wires or wire strands or heating element parts each representing a separate resistance in the electrical circuit diagram, to effect the electrical connections and cabling.

Figure 5:
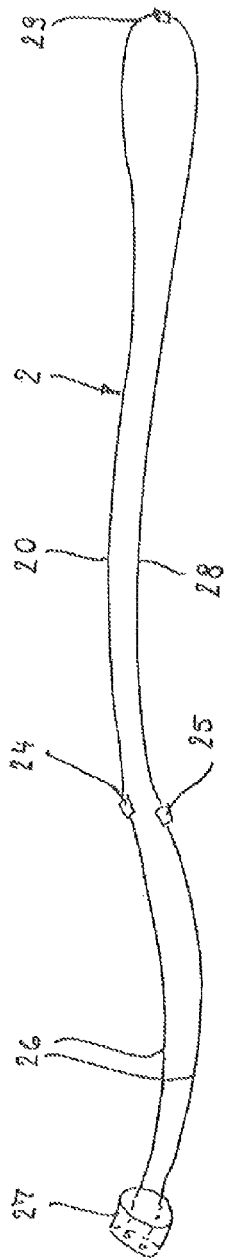
FIG. 5 shows a top view of a second embodiment of a heating element according to the invention with two wires or wire strands connected with each other.

The above also applies to the embodiment of the heating element 2 according to FIG. 5, in which the heating element is composed of two wires or wire strands 20, 28 which are equally long. These two wires or wire strands are connected with each other at one end as indicated by the connecting point 29. Again this leads to a looped shaped heating element which at both ends is connected via connections 24, 25 to two cold conductors or electrical connectors 26 which in turn are connected to the plug connector 27, in order to permit connection to a current or voltage source for the heating element 2. Such a heating element can be fitted in a continuous wrapping process to the medium pipe, preferably, however, in a discontinuous process in order to avoid cut-offs. With a continuous wrapping process the wire or wire strand is wound uniformly from one end of the medium pipe to the other, whereas with a discontinuous wrapping process wrapping is effected simultaneously from both ends towards the centre, as described further down with reference to FIG. 16.

Figure 6:
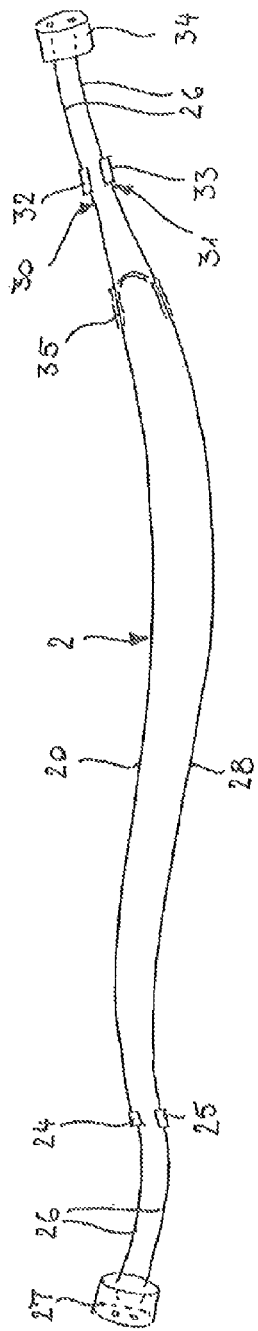
FIG. 6 shows a top view of a third embodiment of a heating element according to the invention with two wires or wire strands which at their ends are provided with cold conductor or electrical connector connections and plug connectors, respectively.

With the embodiment of the heating element according to FIG. 6 this also comprises two wires or wire strands 20, 28. These are not, however, connected via a single connecting point 29 with each other, but connected in the area of one end again via connections 24, 25 with cold conductors or electrical connectors 26. At their opposing ends 30, 31 they are provided with connections 32, 33 for connecting to two cold conductors or electrical connectors 26. These two cold conductors or electrical connectors 26 are also connected with a plug connector 34 in order to allow connection of the heating element to an energy source. As mentioned with reference to FIG. 5, the embodiment of FIG. 6 may similarly be provided with continuous wrapping, wherein cut-offs are incurred, however, or with discontinuous wrapping, wherein no cut-offs are incurred and therefore no length adjustment is necessary at the ends of the wires or wire strands.

In order to attach both wires or wire strands 20, 28 in the pipe connector 11 or 110, a strap element 35 is provided. This is connected to both the wire or wire strand 20 and the wire or wire strand 28 as revealed in FIG. 6. Due to the stirrup shape of the strap element 35 it is possible to fix it on the centering pivot 15 of the pipe connector 11, for example, i.e. to loop the strap element over the centering pivot 15. The ends 30, 31 extending outside the strap element of wires or wire strands 20, 28 with connected cold conductors or electrical connectors 26, in the same way as the opposing ends of the two wires or wire strands 20, 28, can be guided out of the heatable medium pipe as branching-off line. This is revealed, in particular, in FIG. 10. The connection 32 to the cold conductor or electrical connector 26 is shown here as a crimping point within the protective cap 13. The cold conductor or electrical connector 26 is guided out of the protective cap 13 outside the corrugated pipe 14. A corresponding solution is shown in FIG. 9 and FIG. 8. Here the cold conductor or electrical connector is fixed at the desired point with regard to the pipe connector and in particular with regard to the heating element, thereby substantially preventing the heating element from becoming involuntarily detached from the cold conductor or electrical connector in case of vibrations, as they may occur in a lorry when in operation.

Figure 7:
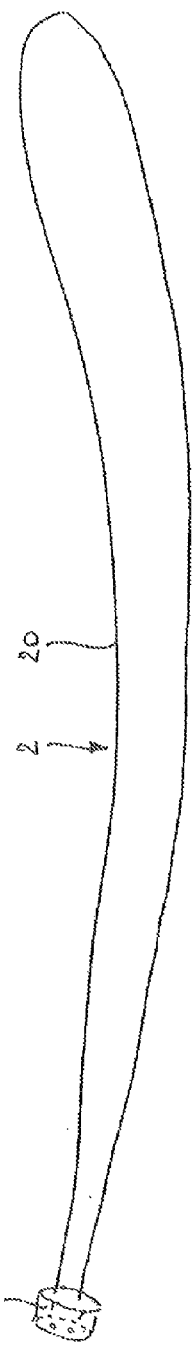
FIG. 7 shows a top view of a further embodiment of a heating element according to the invention in the form of a one-part double-laid loop with a plug connector directly connected at the end.

With the embodiment of the heating element 2 according to FIG. 7, this is connected as a one-piece wire or wire strand 20 with the plug connector 27, via which it is possible to effect a connection to a current or voltage source. A connection may also be integrated directly with the pipe connector or the protective caps. In this case there is no need for providing the plug connector 27 separately.

Figure 11A:
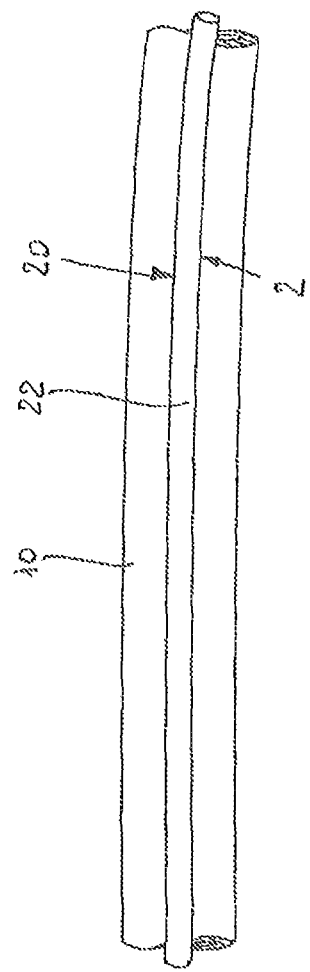
FIG. 11a shows a top view of a media pipe with a wire or wire strand arranged and guided in parallel along the seine, according to the invention.
Figure 11B:
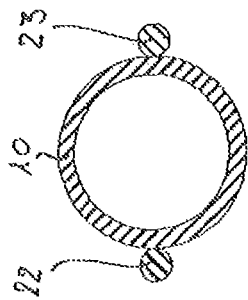
FIG. 11b shows a cross-sectional view through the medium pipe with a wire or wire strand as per FIG. 11a, FIG. 12 shows a detail view of a medium pipe according to the invention with the wire or wire strand of a heating element coiled around the medium pipe.
Figure 12:
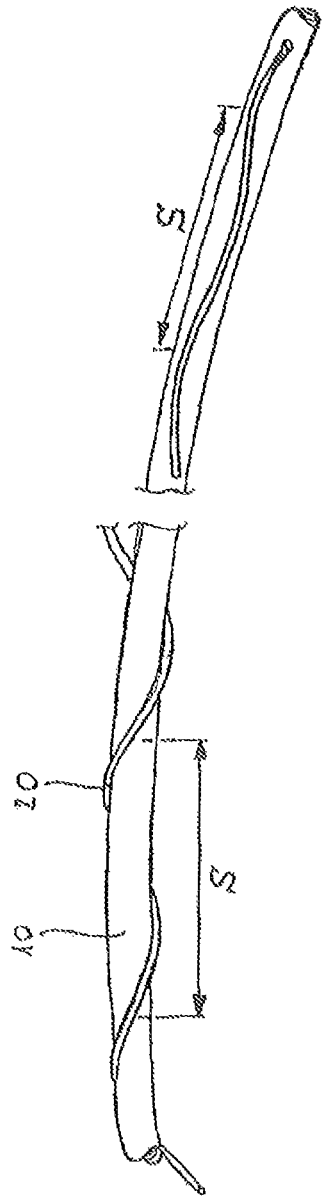

FIGS. 11a and 11b show the tubular medium pipe 10 with two partial sections 22, 23 of wire or wire strand 20, which are arranged on opposing sides of the medium pipe in parallel with the same. This, albeit, leads to a most efficient material input, with heat input also being sufficient in principle in order to provide sufficient heat for heating the medium flowing in the medium pipe, but it is not possible to bend the medium pipe at random, since the two partial sections 22, 23, of the wire or wire strand 20 become displaced, i.e. do not remain in the desired position. It has become evident that in particular for an infinite pitch of the wire or wire strand along the medium pipe, and even for a pitch of 300 mm, the wire or wire strand slides uncontrollably on the outside of the medium pipe and when the pipe is bent, forms itself into a random radius which may not correspond to the bend of the medium pipe. Therefore a lesser pitch, in particular a pitch S of 20 to 150 mm is preferred. In FIG. 12 the enwrapping of the medium pipe 10 with the wire or wire strand 20 at such a lesser pitch S is indicated. FIG. 12 shows two variants of how the wire or wire strand or wires or wire strands can be arranged on the medium pipe, i.e. wrapping and arranging in wave-line form, wherein the pitch S of the wire or wire strand winding is indicated in both variants.

Figure 14:
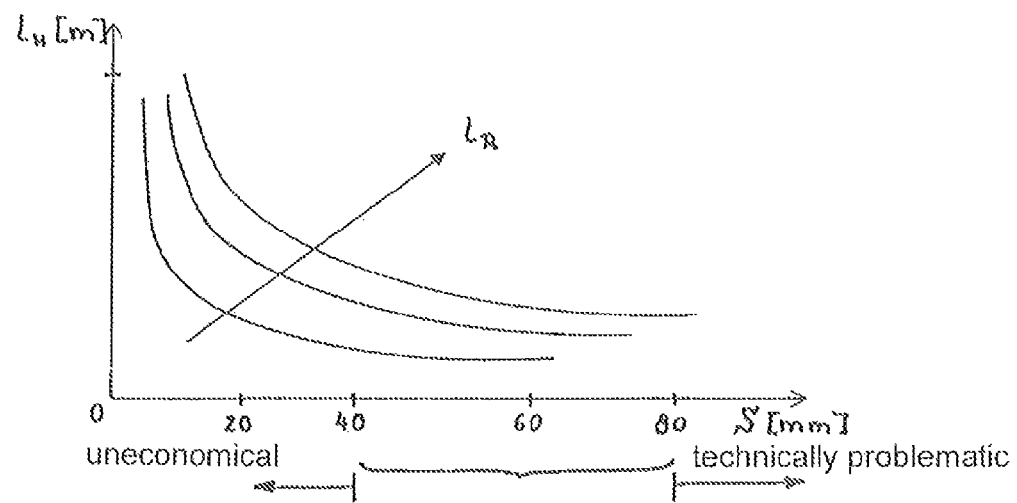
FIG. 14 shows a diagram for illustrating an optimal pitch, where the heating conductor length is plotted over the pitch and the pipe length.

As revealed in the diagram in FIG. 14, this pitch S, which is indicated in the diagram in mm, may be varied depending upon the heating element length $I_H$ indicated in the diagram in FIG. 14 and depending upon the length $I_R$ of the medium pipe, where the length of the medium pipe increases in direction of the arrow. According to the diagram in FIG. 14 a pitch of between 20 and 150 mm has proven economical and technically practicable, with a pitch between 40 and 60 mm being the most favourable range. This applies both when providing a heating element with one wire or wire strand and a heating element with two wires or wire strands run in parallel to each other, wherein the cold conductors or electrical connectors or feeders arranged at the ends of the heating element may be from zero to four conductors.

Figure 13:
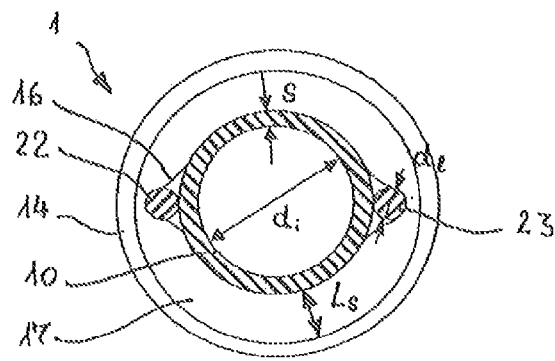
FIG. 13 shows a cross-sectional view through the heatable medium pipe according to the invention with a wire or wire strand guided in parallel along the medium pipe.

FIG. 13 again shows a cross-section through a fully assembled heatable medium pipe 1 in the area of the tubular medium pipe 10, wherein the two partial sections 22, 23 of wire or wire strand 20 of the heating element 2 are arranged at this point on opposing sides of the tubular medium pipe 10. Fixing by the adhesive tape, textile adhesive tape or textile tape 16 is also indicated as is envelopment with the corrugated pipe 14. The inner diameter $d_i$ of the tubular medium pipe 10 may, for example, be between 2 and 4 mm, in particular 2 to 3 mm. The wall thickness a of the tubular medium pipe 10 may be 0.5 to 1 mm, in particular 0.7 mm. The wire or wire strand 20 may have a diameter of $d_f$=0.12 to 0.18, in particular 0.14 mm. The air gap 17 remaining between the outside of the medium pipe 10 and the inside of the corrugated pipe 14 may be an amount $L_S$ between 0.1 and 0.4 mm, in particular 0.2 mm, wherein due to providing the corrugated pipe a larger air gap is provided at the peaks of the waves than in the troughs of the waves.

As also revealed in FIGS. 8 to 10 the pipe connectors provided may be shaped straight and/or angled depending on how the remaining connections are laid out in the vehicle. The heatable medium pipe too, having been fully assembled, can be bent randomly and adapted to suit the local conditions of the installation space in the vehicle or the place in which the tubular medium pipe is to be installed. This is the main reason why care is taken to ensure that the pitch of the wire or wire strand or wires or wire strands 20, 28 along the tubular medium pipe 10 is chosen such that this can be maintained when bending the medium pipe into shape, wherein the pitch may vary across the medium pipe due to length compensation, thereby ensuring that an optimal heating of the medium within the medium pipe can be ensured. Bending of the heatable medium pipe is normally carried out under the influence of heat in order to ensure lasting deformation. Bending to shape may, for example, be carried out using superheated steam, or in an oven.

Figure 15:
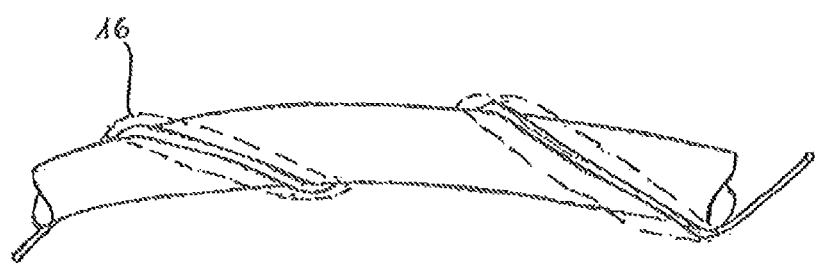
FIG. 15 shows a detail view of a wire or wire strand of a heating element wound about a medium pipe according to the invention, wherein the wire or wire strand is fixed by an adhesive tape or a textile tape on the outside of the medium pipe.

Fixing of the heating element on the outside of the tubular medium pipe 10 is effected by means of an adhesive tape or textile tape 16. It is particularly economic to perform the gluing or fixing by guiding the adhesive tape, textile adhesive tape or textile tape 16 along the wires or wire strands 20 or 28 as indicated in FIG. 15. This ensures not only especially good fixing of the wire or wire strand on the top of the medium pipe but also a correspondingly low consumption of adhesive tape, textile adhesive tape or textile tape 16. Alternatively it is possible to provide complete radial enwrapping of the wires or wire strands and the tubular medium pipe 10, using a narrow adhesive tape, textile adhesive tape or textile tape for example, wherein radial overlapping during wrapping has proven to be advantageous in order to be able to provide sufficient tensile stress.

Figure 16:
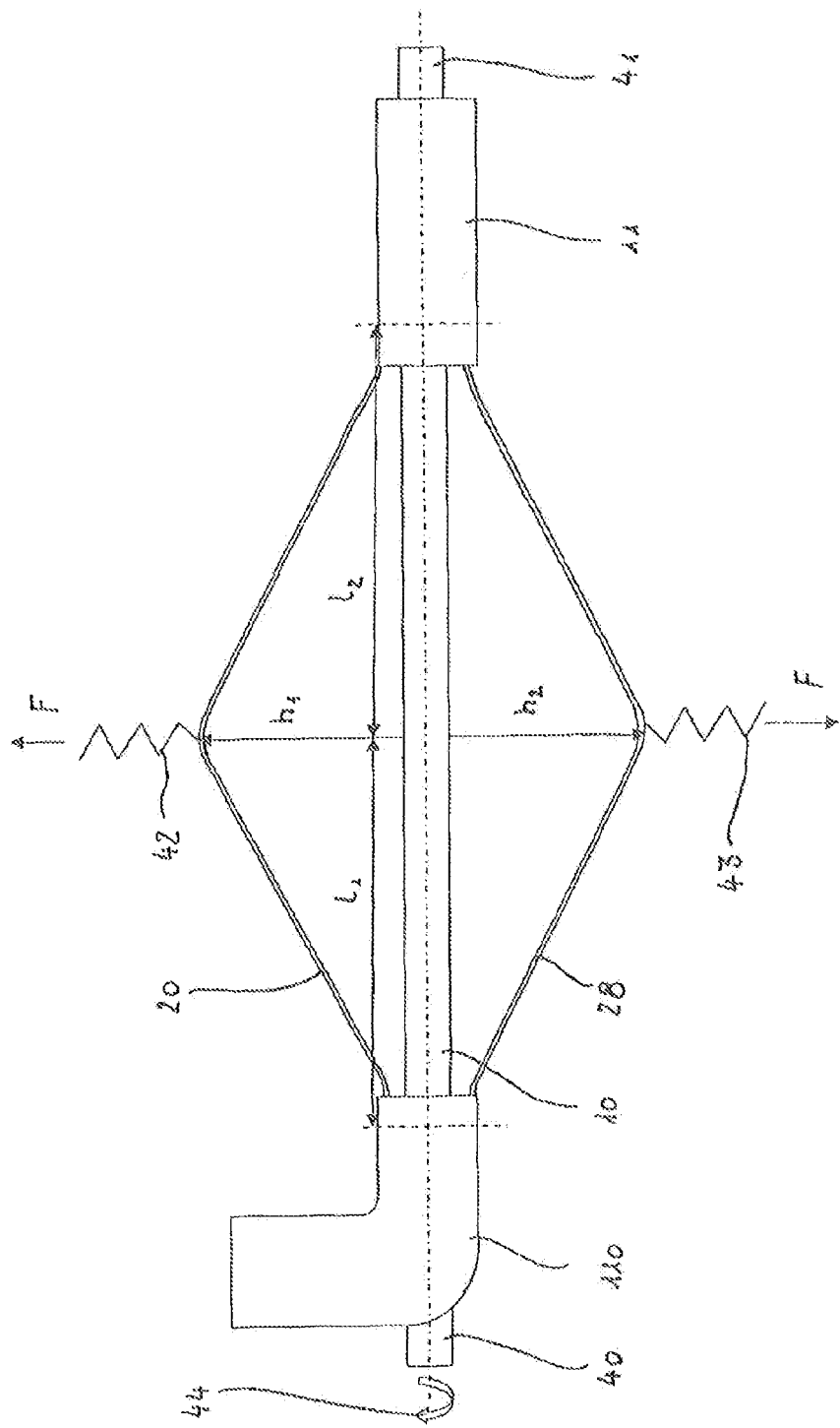
FIG. 16 shows a top view of a heatable medium pipe according to the invention, arranged in a winding machine for winding the wires or wire strands of the heating element around the medium pipe.

In FIG. 16 parts of a winding machine for winding the wires or wire strands 20, 28 around the tubular medium pipe 10 are indicated. In this arrangement the medium pipe 10 is equipped with an angled pipe connector 110 and a straight pipe connector 11 at the two ends. Both pipe connectors are arranged in a first and a second holder 40, 41 of the winding machine not shown in detail in other respects, which winding machine permits rotating the pre-assembled module of medium pipe 10 and pipe connectors 11, 110. This is indicated by a corresponding arrow in FIG. 16.

Along their longitudinal extension in approximately the central area of medium pipe 10 the two wires or wire strands 20, 28 are acted upon by a tensile force F in a direction facing away from the same. This is generated by springs 42, 43 engaging at the two wires or wire strands 20, 28. Due to the combination of rotational movement and initial tension it is possible to wrap the wires or wire strands under tensile stress onto the outside of the medium pipe 10. In order to ensure that no overlapping occurs during wrapping, both the lengths $I_1$ and $I_2$ and also the height distances $h_1$ and $h_2$ as indicated in FIG. 16 in respect of the longitudinal extension and height extension of the two wires or wire strands 20, 28 are set to be equal. The lengths $I_1$ and $I_2$ are measured respectively from the ends of the medium pipe 10 to the position where the tensile force F acts upon the two wires or wire strands, and the height distances $h_1$ and $h_2$ are respectively measured at the position where the tensile force acts upon the wires or wire strands 20, 28 in respect of the outside of the medium pipe 10.

During wrapping the pitch may vary slightly across the longitudinal extension of the medium pipe 10, wherein due to exhausting the tolerance field a pitch results which merely lies within the tolerance. It is however possible during continuous wrapping from one end of the medium pipe to the other to deliberately vary the pitch or to maintain a randomly varying pitch during wrapping towards the centre (discontinuous wrapping). Depending upon the point at which an especially large heat input is required, a partially variable pitch or a lesser pitch for a desired larger heat input may be provided. The number of windings is higher here than in the remaining area of the heatable medium pipe. By providing a winding machine as indicated in FIG. 16 positioning of the wires or wire strands along the medium pipe is especially accurate.

Apart from the variants of heatable medium pipes mentioned and shown in the figures numerous further variants may be formed, where respectively at least one pipe connector and heating element are provided with a few, in particular one or two wires or wire strands, wherein the heating element extends along the pipe connector and the medium pipe and the wire or wire strand or wires or wire strands extend without any joints in the transition area between the medium pipe and the pipe connector and continuously along the pipe connector and the medium pipe on the respective outside thereof. During manufacture of such a heatable medium pipe a first module having a medium flowing through it and consisting of a medium pipe and at least one pipe connector is pre-assembled and then combined and connected with a second module consisting of the heating element with one or two wires or wire strands, wherein the heating element is arranged on the outside of the first module and fixed to the same.

LIST OF REFERENCE SYMBOLS 1 heatable medium pipe
2 heating element
10 tubular medium pipe
11 pipe connector
12 transition area
13 protective cap
14 corrugated pipe
15 centering pivot
16 adhesive tape, textile adhesive tape or textile tape
17 air gap
18 winding groove
19 rib
20 wire or wire strand
21 loop
22 partial section
23 partial section
24 connection
25 connection
26 cold conductor or electrical connector
27 plug connector
28 wire or wire strand
29 connecting point or joint
30 end
31 end
32 connection
33 connection
34 plug connector
35 strap element
40 first holder
41 second holder
42 spring
43 spring
44 arrow
110 pipe connector
120 transition area
130 protective cap
170 air gap
230 holding element
$R_L$ resistance of heating element
S pitch
$l_H$ heating element length
$l_R$ medium pipe length
s wall thickness of medium pipe
$d_i$ inner diameter of 10
$d_l$ diameter of wire or wire strand
s wall thickness
$L_S$ size of air gap
F tensile force

What is claimed is:

1. A heatable medium pipe, comprising: at least one pipe connector and a heating element, wherein the heating element has one or two wires or wire strands, wherein the one or two wires or wire strands extend continuously both along the medium pipe and along the at least one pipe connector wherein the one or two wires or wire strands extend without a joint in a transition area between the medium pipe and the pipe connector and continuously along the pipe connector and the medium pipe on a respective outside thereof, wherein a loop formed of the one wire or wire strand or a member connecting the two wires or wire strands is fixed or attached to a centering pivot on an outside of one of the at least one pipe connector.

2. The heatable medium pipe according to claim 1, wherein the one or two wires or wire strands of the heating element are the one wire or wire strand forming the loop.

3. The heatable medium pipe according to claim 1, wherein the one or two wires or wire strands are one-piece parts or are connected via a device to form one continuous part.

4. The heatable medium pipe according to claim 1, wherein at least one branch-off or connection point is provided at ends of the one or two wires or wire strands for connecting a connector for connection to an energy supply.

5. The heatable medium pipe according to claim 1, wherein the one or two wires or wire strands extend close to the pipe at a pitch (S) from 20 to 150 mm about the medium pipe, in the form of a meander or of strung-out waves or a spiral.

6. The heatable medium pipe according to claim 5, wherein the one or two wires or wire strands extend as two, equal, approximately parallel-guided wire or wire strand sections on opposite sides of the medium pipe along the medium pipe.

7. The heatable medium pipe according to claim 1, wherein the one or two wires or wire strands of the heating element, in the area of the pipe connector and the medium pipe as well as the transition area between medium pipe and pipe connector, are wrapped around the same at an adapted varying pitch (S) for creating a uniform heat input.

8. The heatable medium pipe according to claim 1, wherein a wire or wire strand thickness ($d_l$) of the heating element is less than 0.2 mm, with a tolerance of +/−0.4 mm.

9. The heatable medium pipe according to claim 1, wherein in addition to the one or two wires or wire strands, a fastening element for fastening the one or two wires or wire strands on the medium pipe and/or an insulation and/or protection device for the insulation and/or protection of the medium pipe and/or the pipe connector and/or the transition area between medium pipe and pipe connector are adaptively fitted.

10. The heatable medium pipe according to claim 1, wherein the heatable medium pipe is of modular construction.

11. The heatable medium pipe according to claim 5, wherein the pitch is 40 to 80 mm.

12. The heatable medium pipe according to claim 8, wherein the wire strand thickness of the heating element is less than 0.12 mm with a tolerance of +/−0.4 mm.

13. The heatable medium pipe according to claim 1, wherein the one or two wires or wire strands of the heating element are the two wires or wire strands connected by the connecting member, and wherein the connecting member is a strap element.

14. A method for producing a heatable medium pipe, comprising the medium pipe, at least one pipe connector, a transition area between medium pipe and pipe connector and at least one heating element, wherein the heating element comprises one or two wires or wire strands comprising the steps of: pre-assembling the medium pipe to include at least one pipe connector, pre-assembling the one or two wires or wire strands as a double-laid, one- or two-part element or as an element connected to form a continuous part, arranging and fixing the one or two wires or wire strands on the outside of pipe connector, transition area and medium pipe, and guiding the ends of the one or two wires or wire strands into a feed-in connector for connecting to a current or voltage source, wherein one of the at least one pipe connector has a centering pivot on an outside thereof, wherein a loop formed of the one wire or wire strand or a member connecting the two wires or wire strands is fixed or attached to the centering pivot, and thereafter the one or two wires or wire strands are guided or wound continuously along the pipe connector, the transition area and the medium pipe on the outside thereof.

15. The method according to claim 14, wherein the one or two wires or wire strands the heating element comprises are the one wire or wire strand forming the loop.

16. The method according to claim 14, wherein the partial sections of the one or two wires or wire strands are wrapped around the medium pipe approximately parallel to each other on two opposite sides of the medium pipe along the same and/or at a pitch of 20 to 150 mm, and/or strung-out in the form of a meander and/or a spiral, wherein wrapping is started at a central point of the medium pipe at an initial tension.

17. The method according to claim 14, wherein the one or two wires or wire strands are arranged in the area of the pipe connector at a small pitch (S), of less than 80 mm, wherein they are wrapped around the pipe connector in the form of a spiral and/or a meander or in a strung-out fashion about the pipe connector.

18. The method according to claim 14, wherein at least one device for the protection and/or insulation of the medium pipe and/or the pipe connector and/or the transition area between medium pipe and pipe connector is arranged around the same, wherein a corrugated pipe for enveloping the medium pipe and protective caps for enveloping the one or more pipe connectors and the transition area to the medium pipe is arranged so as to surround the same.

19. The method according to claim 15, wherein partial sections of the one or two wires or wire strands are wrapped around the medium pipe approximately parallel to each other on two opposite sides of the medium pipe along the same and/or at a very large pitch of 20 to 150 mm, and/or strung-out in the form of a meander and/or a spiral, wherein wrapping is started at a central point of the medium pipe at an initial tension, wherein the one or two wires or wire strands are arranged in the area of the pipe connector at a small pitch (S), of less than 80 mm, wherein they are wrapped around the pipe connector in the form of a spiral and/or a meander or in a strung-out fashion about the pipe connector, and wherein at least one device for the protection and/or insulation of the medium pipe and/or the pipe connector and/or the transition area between medium pipe and pipe connector is arranged around the same, wherein a corrugated pipe for enveloping the medium pipe and protective caps for enveloping the one or more pipe connectors and the transition area to the medium pipe is arranged so as to surround the same.

20. The method according to claim 15, wherein the one or two wires or wire strands the heating element comprises are the two wires or wire strands connected by the connecting member and the connecting member is a strap element.

21. The method according to claim 14, wherein wrapping is started at a central point of the medium pipe at an initial tension.

\* \* \* \* \*